(No Model.) 2 Sheets—Sheet 1.

L. STAMPACCHIA.
APPARATUS FOR MANUFACTURING CLOSED-ENDED VESSELS.

No. 601,738. Patented Apr. 5, 1898.

Witnesses
Wm H McClellan
Newton H Cullen

Inventor
Luigi Stampacchia
by Carnalt, Sherrill + Lockwood
Attorneys (No Model.) 2 Sheets—Sheet 2.

L. STAMPACCHIA.
APPARATUS FOR MANUFACTURING CLOSED-ENDED VESSELS.

No. 601,738. Patented Apr. 5, 1898.

Witnesses
Wm. H. McClellan
Newton Hullen

Inventor
Luigi Stampacchia
by Harnalt, Sherrill & Lockwood
Attorneys

UNITED STATES PATENT OFFICE.

LUIGI STAMPACCHIA, OF BOLOGNA, ITALY, ASSIGNOR TO ERNESTO G. FABBRI, OF NEW YORK, N. Y.

APPARATUS FOR MANUFACTURING CLOSED-ENDED VESSELS.

SPECIFICATION forming part of Letters Patent No. 601,738, dated April 5, 1898.

Application filed August 10, 1896. Serial No. 602,309. (No model.) Patented in Italy September 15, 1894, No. 37,179; in Switzerland March 14, 1896, No. 12,178; in England March 18, 1896, No. 6,099; in Belgium March 31, 1896, No. 120,364, and in France June 25, 1896, No. 254,784.

*To all whom it may concern:*

Be it known that I, LUIGI STAMPACCHIA, of Bologna, Italy, have invented an Improved Method of and Apparatus for Manufacturing Hollow Ware, of which the following is a specification.

This invention was patented to me in Italy September 15, 1894, No. 37,179, and to agents of mine, as communications from me, in Great Britain March 18, 1896, No. 6,099, to W. Lloyd Wise; in Switzerland March 14, 1896, No. 12,178, to Franchi & Co.; in France June 25, 1896, No. 254,784, and in Belgium March 31, 1896, No. 120,364.

This invention relates to apparatus for manufacturing closed-ended vessels, each from a single sheet of metal, preferably the ordinary tin-plate of commerce, and other material, at the same time keeping the original thickness of the metal or other material the same throughout or effecting a uniform reduction therein, as the exigencies of the case may require.

With apparatus of this sort heretofore known it has been impossible to produce by the cold-working method hollow seamless articles having a depth greater than their diameter without reducing the thickness of the sheet, which results in making the method comparatively slow and expensive, whereas any desired depth may be obtained by subjecting the articles to a series of operations in my improved dies, the articles being operated on while cold and being produced rapidly and inexpensively with or without reducing the thickness of the material operated on.

With my apparatus I am able to reduce the expense of producing articles of the character stated to such a degree as to permit them to be used in place of the ordinary soldered packing-cans now on the market, the objections to solder being well known. I am also able to produce cartridge-shells, boxes, and other closed-ended vessels at a great saving in cost and without seam or solder and with sides of uniform thickness throughout, as more fully hereinafter set forth.

Figure 1:
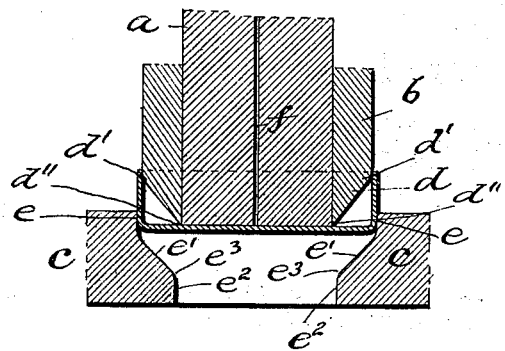
Figure 2:
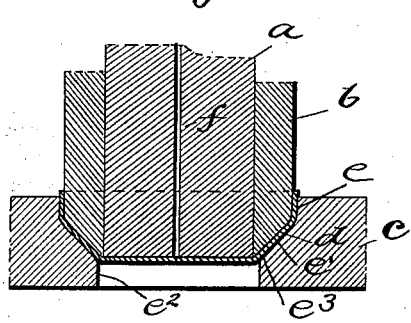
Figure 3:
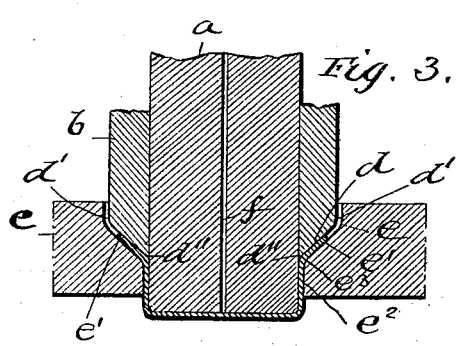
Figure 4:
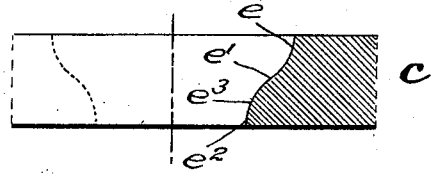

Referring to the drawings, Figure 1 is a transverse sectional view of the apparatus, showing the position of the parts the moment before the plungers begin to operate on the previously-formed cup; Fig. 2, a similar view, the outer plunger having reached the point where it comes to rest; Fig. 3, a similar view, the inner plunger being shown in the act of drawing the article from between the die and the outer plunger; Fig. 4, a view, partly in side elevation, showing a slightly-modified form of die; and Fig. 5, a side elevation of a machine embodying mechanism for operating the plungers.

The inner plunger $a$ is shown as cylindrical; but of course it may be of any other shape desired in cross-section, its form being determined by the cross-sectional shape of the vessel it is desired to produce, and the outer plunger $b$ is similarly shaped and is fitted nicely on the inner plunger, so as to slide thereon with the least possible friction consistent with accuracy of action. The lower end of the outer plunger is beveled off downward and inward, as at $d$, to a comparatively sharp lower edge $d''$, this edge terminating (when the plungers are raised) at the lower end of the inner or solid plunger, the corner at the juncture of the inclined wall $d$ and the vertical exterior wall being rounded off, as at $d'$, both the inclination of said wall and the arc of the circle on the convex corner being determined by the tensile strength of the metal, vessel to be produced, &c. Suitable longitudinal openings $f$ are formed in the solid plunger to permit escape of air.

The opening in the die-plate is peculiarly formed. The opening is similar in shape in cross-section to the plungers taken together, its upper part conforming to the shape of the outer plunger and its lower smaller part to the inner plunger. The upper part $e$ of the opening is equal in diameter to the diameter of the two plungers plus the thickness of the metal all around, and its wall is concaved to correspond to the curvature of the corner $d'$ of said plunger. The wall of the opening below the part $e$ converges, as at $e'$, its inclination corresponding to the angle of the wall $d$ of the outer plunger. This converging wall joins the wall $e^2$ of the lower part of the opening, the corner at the juncture being rounded off to a suitable degree, as at $e^3$. The lower part of the opening is equal to the inner plunger plus the desired thickness of the metal all around. Thus when both plungers are lowered to the fullest extent there is left between the plungers and the die a channel of the thickness of the metal, or in case it is desired to reduce the thickness the channel between the inner plunger and the lower portion of the die is of such reduced thickness.

Any suitable mechanism may be used to operate the plungers.

Figure 5:
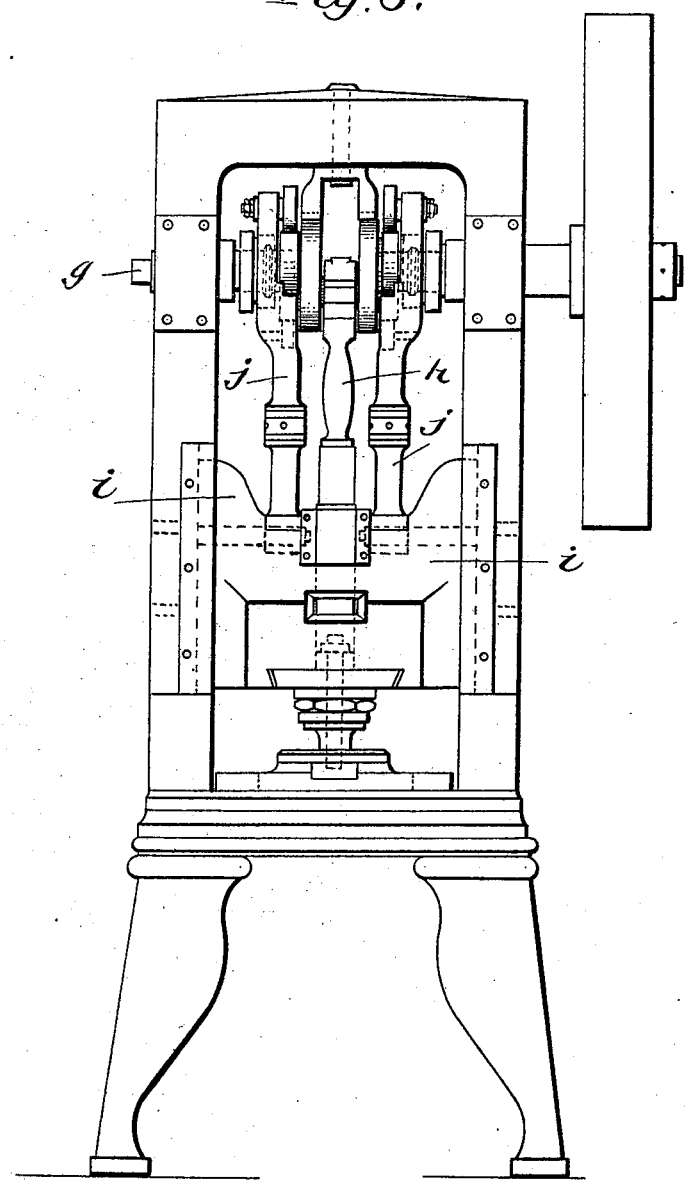

In Fig. 5 I show a simple mechanism for operating the plungers, consisting, essentially, of a horizontal shaft $g$, suitably supported and provided with a central crank connected to the pitman $h$, carrying the inner plunger, this pitman passing through and being guided by a cross-head $i$, which is in turn guided in ways in the frame of the machine. This crosshead carries the outer plunger and is operated vertically by two pitmen $j$, one on either side of the pitman $h'$ and respectively engaging operating-cams carried by the shaft $g$, said cams being, of course, so shaped as to rigidly hold the outer plunger at the proper point.

As shown in Fig. 4, the two arc-shaped corners $e$ and $e^3$ may be struck on larger circles and directly connected, thereby giving a slight compound curvature to the intermediate wall $e'$ instead of a straight incline. This curvature of the converging wall, however, makes it substantially equivalent to an inclined wall, and I wish it understood that wherever the wall is referred to in the claims as being "inclined" it is to be construed broadly enough to cover either a straight or curved inclined wall.

Operation: The blank, which has been previously formed into a shallow cup by this or any of the suitable stamping-machines in common use, is set within the die-opening, closed end downward, as shown in Fig. 1. The cup just fits within the opening and is of course adapted to fit over the outer plunger when the same descends. The two plungers are brought down together to the position shown in Fig. 2, whereupon the central plunger continues to descend until the blank is drawn entirely through the die, the outer plunger remaining at a standstill and being rigidly held against movement in all directions. The effect of the two plungers descending together is to initially shape or stamp the blank to conform to the upper walls $e$ $e'$ of the die-opening, and as soon as this is accomplished the outer plunger comes to rest, forming a channel of uniform thickness between said walls of the plunger and the inclined walls of the die, the walls of the channel being rigid and unyielding at all points. The hollow plunger will be accurately adjusted and rigidly held, so that the metal is subjected to no compressive force except that generated by its tendency to thicken or crimp during the converging action, and then only to the exact force necessary to counteract such tendency. As the metal passes down into the channel it is received by the curved walls $d'$ $e$ and initially converged and directed into the funnel-shaped channel, down which it passes with the least amount of friction, and the edge $d'$ on the outer plunger and edge $e^3$ in the die serve as draw edges, the friction and pressure incident to changing the direction of movement of the metal being divided between them. The walls of the inclined channel in which the converging or crowding action is going on being rigid with respect to each other, no crimping of the metal sheet is permitted, but instead the metal is compelled in its downward course to spread or flow in the direction of the drawing motion uniformly and without undue strain at any point, thus ultimately adding to the height of the walls of the vessel produced. The inclined portion of the channel accomplishes the converging of the metal gradually and with the least possible violence to the metal undergoing operation, and thus avoiding undue violence to the disturbance of the molecules not only reduces friction, but also preserves the prime strength of the metal and in some instances increases the strength thereof. Thus inclining the portion of the channel in which the converging action is going on is also advantageous in that it further reduces the friction by reason of the fact that the downward pressure of the hollow plunger is decomposed upon the principle of the parallelogram of forces, a portion only of the force operating to prevent the metal from thickening, while the remainder of the force is exerted in the direction of the flow of the metal and therefore in aid of the drawing action of the inner plunger. It will also be observed that this action is extended over all that part of the surface of the metal in the portion of the channel between the inclined surfaces, thus diminishing the strain upon the tensile strength of the metal necessary to accomplish that result at any one point. Thus reducing friction and avoiding weakening of the metal by violent or abrupt disturbances enables me to produce far deeper seamless vessels than has heretofore been possible with dies of this character for drawing cold metal. By means of the dies now commonly used it has not been possible to produce vessels having a height greater than their diameter, owing to the fact that the friction is so great that the ordinary sheet metal of commerce is not strong enough to pull the blank through the die without breaking the metal or the tinned or varnished surface, whereas with dies of my construction I am able to rapidly produce (more than sixty a minute) seamless vessels having a height several times their diameter and a wall or walls uniform in thickness throughout at a cost less than that of soldered cans.

In practice I have found it necessary in order to produce vessels having a diameter about twice their height (such as cartridges)

to employ two dies, the second of course being smaller in diameter than the first; but it is evident that the number of dies employed will depend upon the character of the metal and the dimensions of the vessel it is desired to produce. An important feature, however, resulting from the fact that my die preserves the original strength of the metal is not only that a greater reduction in the diameter of the vessel may be obtained at each operation, thus diminishing greatly the expense, but also that the article will stand a greater number of successive reductions, thus enabling me to produce seamless articles of a depth not heretofore obtained without annealing.

I have found in practice that the friction and disturbance of the metal in passing through the die is so greatly obviated that tin and varnish coatings on the metal are not materially injured or disturbed, whereby the metal may be tinned and ornamented or labeled while in the blank state. The importance of this fact will be at once apparent to those skilled in the art. Unless the tinned surface is preserved in the completed vessel it will rust and is not adapted to the canning of food products. The varnish or ornaments, moreover, can be applied to the blank sheet by one impression at a much less cost than if it is to be applied to the different surfaces of the completed vessel.

It will be obvious that if the inner plunger be made of a suitable larger diameter a reduction of the thickness of the wall of the vessel may be effected simultaneously with the elongation of the vessel or capsule; but whether or not the wall of the vessel be reduced in thickness it will be of uniform thickness throughout.

It will be observed that an essential feature lies in extending the wall of the die-opening above the upper termination of the inclined portion, as at $e$, the corner at the junction of the two portions being concaved and said extended portion embracing the rounded corner of the outer plunger when the latter is down. In this way the vertical wall of the previously-formed vessel is compelled to pass directly downward into the converging part of the channel with the least possible violence and friction, the rounded corner $d'$ of the outer plunger serving as a sort of draw edge. It is not essential that said part $e$ of the wall be extended farther above the upper extremity of the inclined portion than is sufficient to embrace the rounded draw edge $d'$ of the exterior plunger and hold the metal against the same while being deflected into the inclined channel. Neither is it absolutely essential that the lower part $e^2$ of the wall be extended any farther below the lower extremity of the inclined channel than is sufficient to form an efficient draw edge at $e^3$, although I wish it to be understood that I do not limit the scope of my patent in this respect, since in most cases it will be of advantage to extend the portions $e$ and $e^2$ of the wall a considerable distance beyond the respective draw edges to assist in guiding and supporting the vessel being operated upon. It will be seen, however, that in every case the inclined wall proper of the die terminates short of both the upper and lower faces of the die-plate and that the draw edge on the lower outer corner of the hollow plunger, when the plunger is depressed, lies within the die-opening.

Another essential feature lies in bringing the two plungers down upon the vessel as one solid plunger, the two plungers entering the die together and initially shaping the vessel to all that portion of the die-opening above the draw edge $e^3$, thereby avoiding the injury to the material of the vessel that would result if the sharp edge of the hollow plunger were brought down first and the solid plunger afterward.

It will be understood that this invention is not confined to the details of construction shown and described.

Having thus fully described my invention, what I claim, and desire to secure by Letters Patent, is—

1. An apparatus for elongating open-ended vessels, comprising a die-plate having an opening, a portion of the wall of said opening being inclined downward and inward and the upper and lower portions of the wall of said opening being extended beyond the extremities of the inclined portion, a hollow plunger having its lower end beveled off downward and inward, to correspond to the inclination of said inclined wall, means for reciprocating said hollow plunger and holding it rigidly with the lower outer corner of its lower end within the die-opening, an inner plunger and means for reciprocating it through the hollow plunger and the die-opening.

2. An apparatus for elongating open-ended vessels, comprising a die-plate having an opening, a portion of the wall of said opening being inclined downward and inward and the upper portion of the wall of said opening being extended beyond the upper extremity of the inclined portion, a hollow plunger having its lower end beveled off downward and inward, to correspond to the inclination of said inclined wall, means for reciprocating said hollow plunger and holding it rigidly with the lower outer corner of its lower end within the die-opening, an inner plunger and means for reciprocating it through the hollow plunger and the die-opening.

3. An apparatus for elongating open-ended vessels, comprising a die-plate having an opening, a portion of the wall of this opening being inclined downward and inward, a hollow plunger adapted to enter said opening and having its lower end beveled off to correspond to the inclination of the wall thereof, whereby a rigid-walled converging channel is formed, an inner plunger adapted to reciprocate through the hollow plunger and the die-opening, and means for bringing the two plungers down into the die together as one solid plunger and holding the outer plunger within the die-opening while the central one passes on through the same, as and for the purposes set forth.

4. An apparatus for elongating open-ended vessels, comprising a die-plate having an opening through it, a portion of the wall of said opening being inclined inward and downward, the upper and lower portions of the wall of said opening being extended beyond the extremities of the inclined portion, a hollow plunger having its lower end beveled to correspond to the inclination of said inclined wall, an inner plunger adapted to work through the hollow plunger and die-opening, and means for bringing the two plungers down upon the blank together as one solid plunger and holding the outer plunger with its lower corners within the die-opening while the inner plunger passes through, as and for the purposes set forth.

In witness whereof I have hereunto set my hand in presence of two witnesses.

LUIGI STAMPACCHIA.

Witnesses:
 GUY GUISEPPE FRANCE,
 LUIGI ORLANDO.